US012786543B2

(12) United States Patent
Cashen et al.

(10) Patent No.: US 12,786,543 B2
(45) Date of Patent: Nov. 3, 2026

(54) CAMERA SHUTTER SYNCHRONIZED HEADLIGHT SYSTEM FOR VEHICLE

(71) Applicant: FCA US LLC, Auburn Hills, MI (US)

(72) Inventors: Daniel P Cashen, Auburn Hills, MI (US); Emily A Robb, Auburn Hills, MI (US); Rajeev K Tiwari, Auburn Hills, MI (US); Esaias A Pech, Auburn Hills, MI (US)

(73) Assignee: FCA US LLC, Auburn Hills, MI (US)

(*) Notice: Subject to any disclaimer, the term of this patent is extended or adjusted under 35 U.S.C. 154(b) by 15 days.

(21) Appl. No.: 18/786,930

(22) Filed: Jul. 29, 2024

(65) Prior Publication Data

US 2026/0032330 A1 Jan. 29, 2026

(51) Int. Cl.

| | |
|---|---|
| ***H04N 23/56*** | (2023.01) |
| ***F21S 41/141*** | (2018.01) |
| ***F21S 41/40*** | (2018.01) |
| ***F21S 41/683*** | (2018.01) |
| ***H04N 23/60*** | (2023.01) |
| ***H04N 23/74*** | (2023.01) |
| ***H04N 23/75*** | (2023.01) |
| *F21W 107/10* | (2018.01) |
| *F21Y 115/10* | (2016.01) |

(52) U.S. Cl.

CPC ............ *H04N 23/56* (2023.01); *F21S 41/141* (2018.01); *F21S 41/40* (2018.01); *F21S 41/683* (2018.01); *H04N 23/665* (2023.01); *H04N 23/74* (2023.01); *H04N 23/75* (2023.01); *F21W 2107/10* (2018.01); *F21Y 2115/10* (2016.08)

(58) Field of Classification Search

CPC ...... H04N 23/56; H04N 23/665; H04N 23/74; H04N 23/75; F21S 41/141; F21S 41/40; F21S 41/683; F21W 2107/10; F21Y 2115/10

See application file for complete search history.

(56) References Cited

U.S. PATENT DOCUMENTS

| | | | | |
|---|---|---|---|---|
| 2012/0300074 | A1* | 11/2012 | Hasegawa | H04N 23/70 348/148 |
| 2020/0207252 | A1* | 7/2020 | Guidi | G03B 15/02 |
| 2022/0055527 | A1* | 2/2022 | Lim | B60Q 1/0023 |
| 2022/0148320 | A1* | 5/2022 | Alakarhu | H04N 23/66 |
| 2023/0137419 | A1* | 5/2023 | Sergeev | A01M 21/046 362/459 |

* cited by examiner

*Primary Examiner* — Yogesh K Aggarwal
(74) *Attorney, Agent, or Firm* — Jeremy J. Klobucar

(57) ABSTRACT

A vehicle includes a camera system configured for machine vision functionality and including an image sensor and a shutter, and an exterior lighting system configured to selectively provide a normal illumination and a predetermined peak illumination. A control system is configured to selectively open the shutter to obtain a machine vision image with the image sensor, synchronize the exterior lighting system to provide the predetermined peak illumination while the shutter is open to thereby increase a range of the machine vision, and output the machine vision image to a vehicle system for further use.

20 Claims, 4 Drawing Sheets

CAMERA SHUTTER SYNCHRONIZED HEADLIGHT SYSTEM FOR VEHICLE

FIELD

The present application relates generally to exterior camera and lighting systems for vehicles and, more particularly, to systems and methods for synchronizing exterior camera and lighting systems to improve illumination.

BACKGROUND

Typical vehicles can include driver assistance systems that use forward sensors, such as cameras, to provide feedback or warnings based on objects in the vehicle's path. However, camera vision range is limited during nighttime driving. One solution to improve range is to provide additional sensors or very high sensitivity sensors, but at the cost of increased complexity and expense. Alternatively, camera vision range may be increased by increasing headlight luminance, but is limited to levels that ensure oncoming drivers are not distracted or blinded by the increased luminance. Thus, limited headlight luminance in turn limits both machine and human vision. Accordingly, while conventional vehicle camera systems do work well for their intended purpose, there exists an opportunity for improvement in the relevant art.

SUMMARY

In one example aspect of the invention, a vehicle is provided. In one example implementation, the vehicle includes a camera system configured for machine vision functionality and including an image sensor and a shutter, and an exterior lighting system configured to selectively provide a normal illumination and a predetermined peak illumination. A control system is configured to selectively open the shutter to obtain a machine vision image with the image sensor, synchronize the exterior lighting system to provide the predetermined peak illumination while the shutter is open to thereby increase a range of the machine vision, and output the machine vision image to a vehicle system for further use.

In addition to the foregoing, the described vehicle may include one or more of the following features: wherein the predetermined peak illumination is provided only when the shutter is open; wherein the control system only provides the predetermined peak illumination during nighttime driving; wherein the control system provides the predetermined peak illumination for a duration shorter than a human eye integration time such that the predetermined peak illumination is imperceptible to the human eye; wherein the shutter is a global shutter; wherein the shutter is a rolling shutter; wherein the exterior lighting system includes one or more headlights; wherein the camera system is a forward facing camera system; wherein the control system is configured to output the machine vision image to the vehicle system for object detection and classification; and wherein the vehicle system is an advanced driver assistance (ADAS) system or autonomous driving system.

In accordance with another example aspect of the invention, a method is provided of increasing machine vision range of a vehicle having an exterior lighting system configured to selectively provide a normal illumination and a predetermined peak illumination, and a camera system including an image sensor and a shutter. In one example implementation, the method includes opening, by a control system, the shutter to obtain a machine vision image with the image sensor; synchronizing, by the control system, the exterior lighting system to provide the predetermined peak illumination while the shutter is open to thereby increase the machine vision range; and outputting, by the control system, the machine vision image to a vehicle system for further use.

In addition to the foregoing, the described method may include one or more of the following features: wherein the predetermined peak illumination is provided only when the shutter is open; only providing the predetermined peak illumination during nighttime driving; providing, by the control system, the predetermined peak illumination for a duration shorter than a human eye integration time such that the predetermined peak illumination is imperceptible to the human eye; wherein the shutter is a global shutter; wherein the shutter is a rolling shutter; wherein the exterior lighting system includes one or more pulse width modulated LED headlights; wherein the camera system is a forward facing camera system; outputting, by the control system, the machine vision image to the vehicle system for object detection and classification; outputting, by the control system, the machine vision image to an advanced driver assistance (ADAS) system or autonomous driving system.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DESCRIPTION

As previously discussed, conventional vehicle forward light systems illuminate the area in front of the vehicle with two illumination levels, commonly referred to as low beams and high beams. However, both vehicle machine vision and human vision are limited during nighttime driving due to headlight luminance limits that ensure oncoming drivers are not distracted or blinded. Such limitations may make it difficult to detect objects in the distance that may pose a danger to the vehicle and its occupants. Accordingly, the present application is generally directed to systems and methods for dramatically improving machine vision object detection range without compromising the visibility of oncoming drivers.

In one example, both the vehicle exterior camera and exterior lighting systems are configured to optimize illumination over a short exposure period, thereby dramatically increasing sensor illumination and detection distance while maintaining human vision safe illumination levels over larger integration times. In particular, the headlight and camera systems are configured to illuminate and shutter synchronize the two systems to improve machine vision illumination while preserving human visibility.

Figure 1:
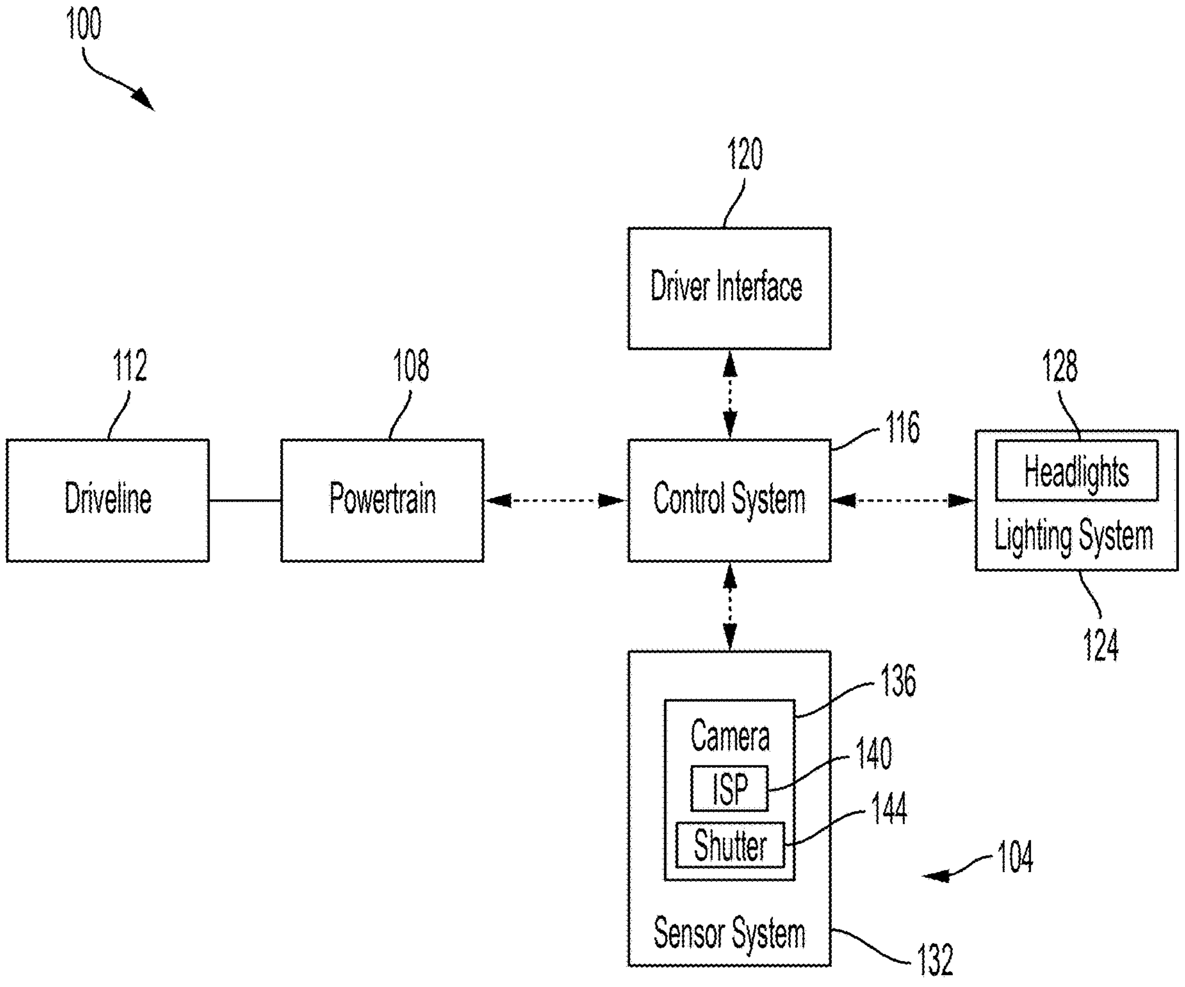
FIG. 1 is a functional block diagram of a vehicle having an example camera system and exterior lighting system to increase machine vision range in accordance with the principles of the present disclosure.

Referring now to FIG. 1, a functional block diagram of a vehicle 100 having an example camera system 104 configured for obtaining both human and machine vision images according to the principles of the present application is illustrated. The vehicle 100 generally comprises a powertrain 108 (e.g., an engine, an electric motor, or a combination thereof) that is configured to generate and transfer torque to a driveline 112 for vehicle propulsion. A control system 116 controls operation of the vehicle 100, including primarily controlling the powertrain 108 to generate and transfer to the driveline 112 a desired amount of torque to satisfy a driver torque request. The driver torque request is received by the control system 116 from a driver interface 120, which could include an accelerator pedal and any other suitable driver input/output systems (e.g., a display configured to display the driver a human vision image relative to the vehicle 100). The control system 116 is also configured to communicate with a vehicle exterior lighting system 124, which includes one or more forward headlights 128.

The control system 116 is also configured to communicate with a sensor system 132, which includes one or more cameras 136 of the exterior camera system 104 according to the principles of the present application. The sensor system 132 may also include other suitable systems/sensors (RADAR sensors, LIDAR sensors, etc.) that are utilized for executing one or more advanced driver assistance (ADAS) or autonomous driving features of the vehicle 100. This could include, for example only, object detection and classification in machine vision images obtained by the camera system 104. Non-limiting examples of the autonomous driving feature(s) of the vehicle 100 include adaptive cruise control (ACC), automated lane keeping or centering, automated lane changing, and collision avoidance. While these are merely some example features, it will be appreciated that the machine vision images obtained by the camera system 104 could be utilized for any suitable level one (L1) through level five (L5) fully autonomous driving of the vehicle 100.

As shown, the camera 136 includes an image signal processor (ISP) or image sensor 140 such as, for example, a charged-couple device (CCD) and a complimentary metal-oxide-semiconductor (CMOS) device with an active pixel array, such as red/clear/clear/blue (RCCB), red/green/green/blue (RGGB), or red/yellow/yellow/cyan (RYYCy) color filter arrays. The image sensor 140 is configured to receive and store image data such as, for example, object detection data, object location data, pixel data, etc. The camera 136 also includes a shutter 144. In one example, shutter 144 is a global shutter configured to capture an entire image simultaneously where, when the camera 136 is exposed to light, all sensor pixels are read out at once. This results in a snapshot of a single point in time.

Figure 2:
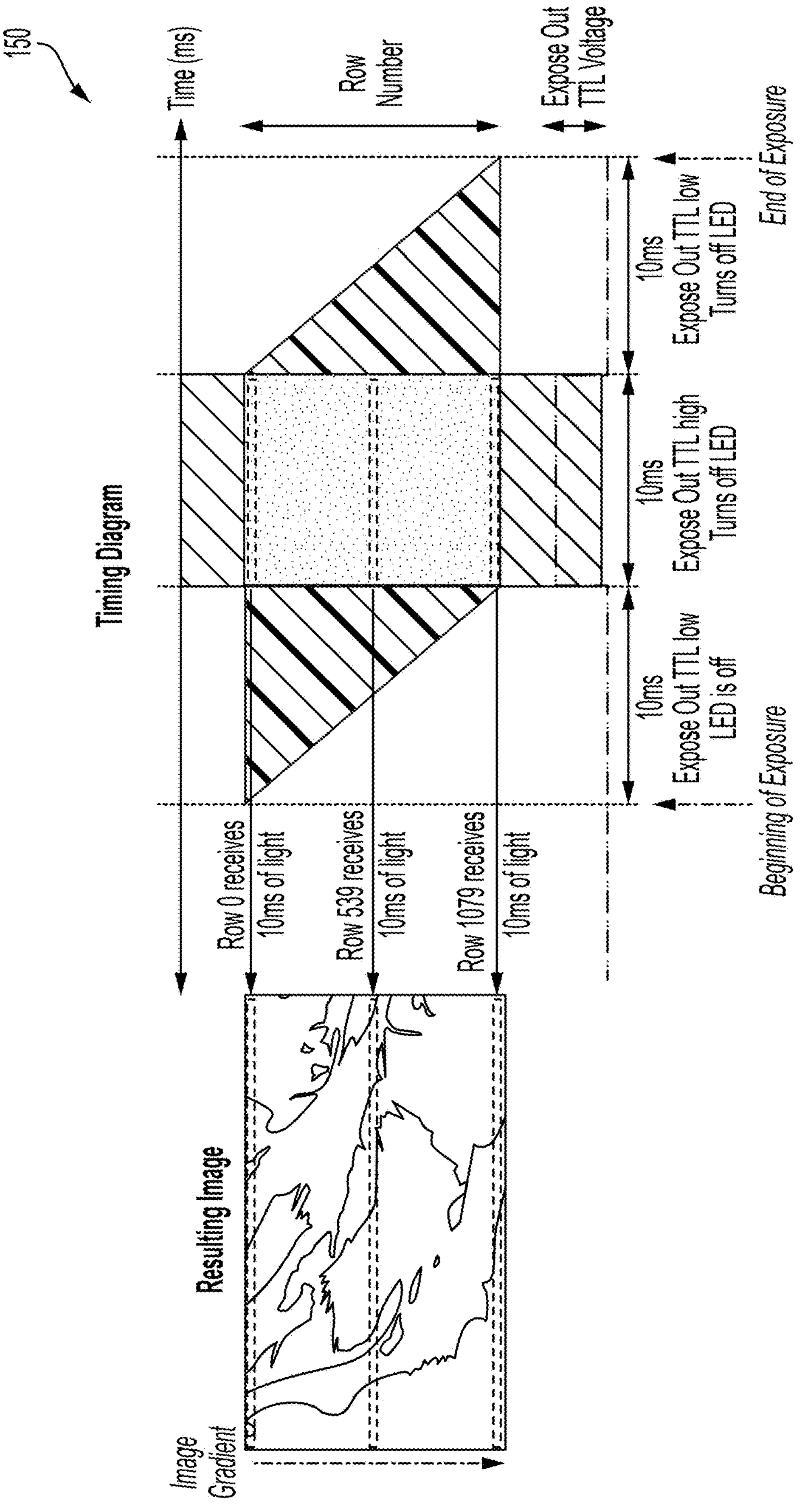
FIG. 2 is an example timing diagram of the camera system and exterior lighting system shown in FIG. 1, in accordance with the principles of the present disclosure.

In another example, the shutter 144 is a rolling shutter where the image sensor 140 reads out row by row when exposed. The readout "rolls" down the sensor rows sequentially. In one example, leveraging a global shutter-based imager, the time at which the shutter 144 is open, exposure, is limited to a fraction of the total frame with an order of magnitude from approximately $1/50^{th}$ to approximately $1/500^{th}$ of a second. The image is only capturing light for a portion of the total frame time. FIG. 2 illustrates an example timing diagram 150 of the rolling shutter 144 and lighting system 124 (LED) where the exposure period is approximately 10 ms or 33% of the total frame time.

Figure 3:
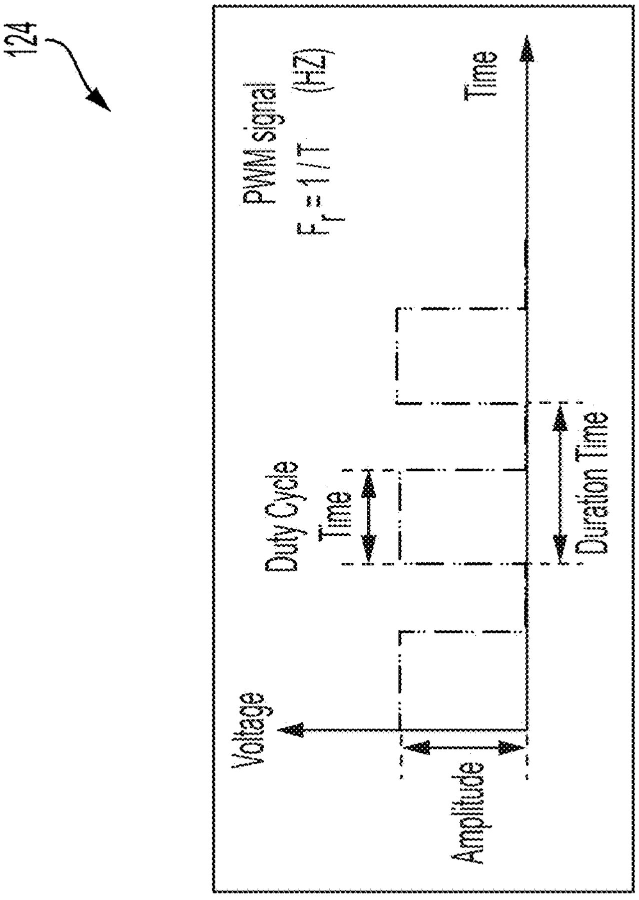
FIG. 3 is a diagram of an example pulse width modulation of the exterior lighting system shown in FIG. 1, in accordance with the principles of the present disclosure.

In the example embodiment, the exterior lighting system 124 is described with reference to headlights 128, but it will be appreciated that the techniques described herein may be applicable to other lighting systems that overlap with external cameras, such as side lighting and surround view cameras, or back up lighting and back up cameras (not shown). In the example implementation, the headlights 128 are LED lights with LED drive circuitry (not shown) where LED drive current is pulse width modulated to achieve a desired luminance, as shown in FIG. 3. The light produced by headlights 128 is configured to illuminate an area in front of the vehicle 100 and is visible to both the human (driver) eye and the camera 136. However, human vision behaves very differently compared to a camera, as described below in more detail.

Figure 4:
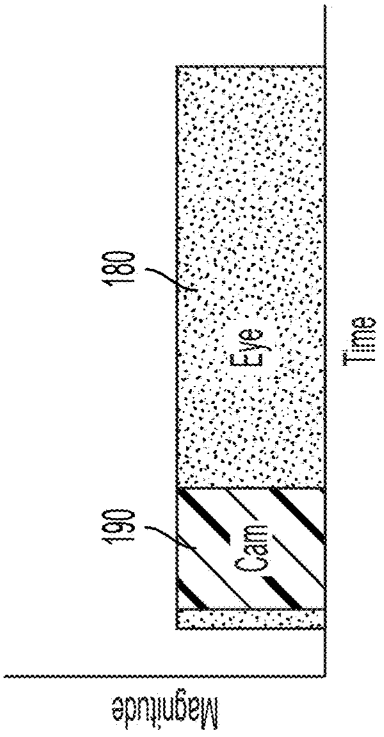
FIG. 4 is a diagram of example integration times for the camera system and a human eye, in accordance with the principles of the present disclosure.

With reference now to FIG. 4, human vision generally relies on rods and cones. Rods are present in large quantities across the entire surface of the retina to provide a scotopic vision with a wide field of view with high sensitivity and low resolution. Cones are less populous and typically located peripherally to provide a photopic vision with lower sensitivity but higher resolution. Cones include three types that are each sensitive to a different part of the visible light spectrum in red, green, and blue. The period of human eye integration is up to 0.1 seconds or 100 ms for rods and 10-15 ms for cones. In this way, rods dominate in low light and have a longer integration time. One advantage of a long integration time is that under limited light level conditions, such as nighttime driving, a threshold will be reached, whereas when light levels are not limiting (cone or photopic vision), a short integration time is preferable to improve temporal resolution.

As shown in FIG. 4, with the human eye integration time 180 approximately ten times larger than the camera imager integration period 190, the lighting illumination of headlights 128 can be synchronized to the camera sensor shutter 144 to allow increased illumination amplitude integrated over the exposure period. In this way, the control system 116 is configured to greatly increase headlight illumination (e.g., 10× or greater) during the camera imager integration period 190 and cease the increased headlight illumination before it is perceptible by the human eye. In one example, the control system 116 includes an algorithm with a shutter synchronization protocol to command the headlights 128 to reach a predetermined peak illumination at the same time as the shutter 144 is opened (see also FIG. 2). Accordingly, the road scene is temporarily illuminated with increased light, resulting in improved nighttime machine vision perception without compromising the visibility of oncoming drivers.

Figure 5:
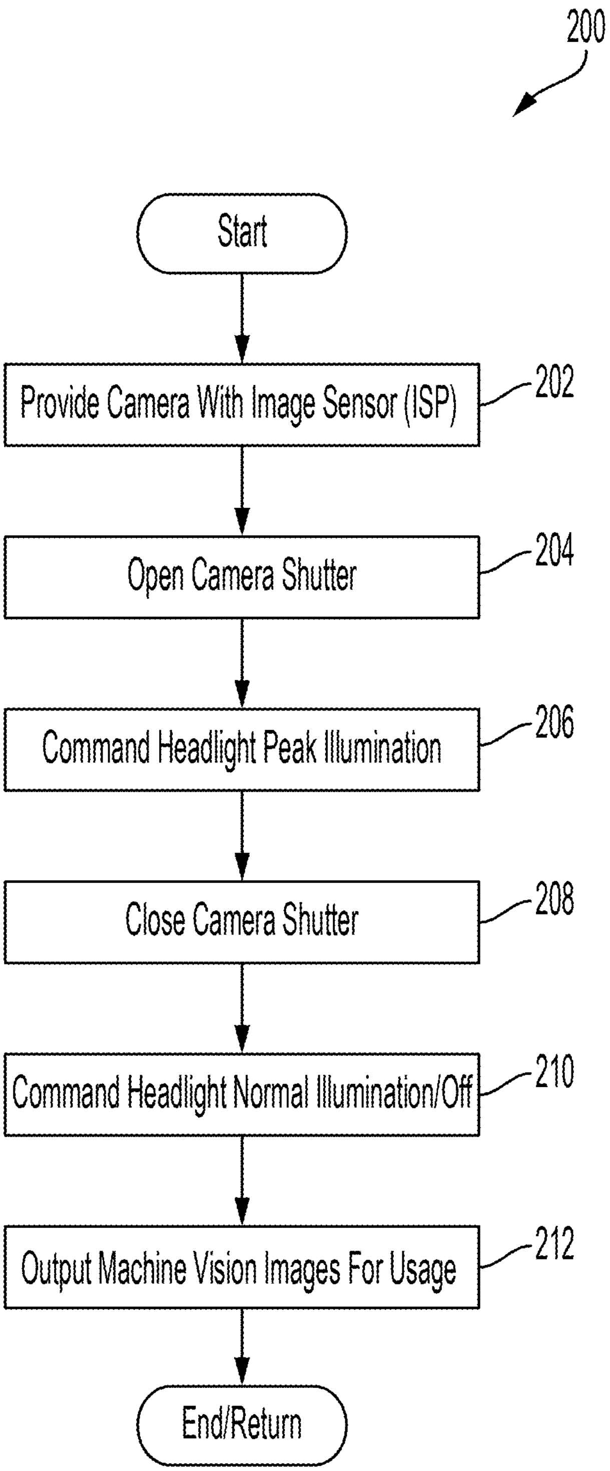
FIG. 5 is a flow diagram of an example method of increasing machine vision range in accordance with the principles of the present disclosure.

Referring now to FIG. 5, a flow diagram of an example method 200 for improving machine vision range during nighttime driving according to the principles of the present application is illustrated. While the vehicle 100 and its components are specifically discussed for descriptive/illustrative purposes, it will be appreciated that the method 200 could be applicable to any suitable vehicle or non-vehicle digital camera system. The method 200 begins at 202 where the camera 136 is provided, which has the image sensor 140 and shutter 144. At 204, the control system 116 (or a separate controller, such as a microcontroller of a system-on-chip (SOC) package for the camera 136) opens the shutter 144 to capture digital image data using the image sensor 140.

At 206, the control system 116 (or a separate controller, such as a microcontroller package for the exterior lighting system 124) commands a predetermined peak illumination of the headlights 128 only while the shutter 144 is open. In this way, the predetermined peak illumination and shutter opening are synchronized. Accordingly, steps 204 and 206 may be performed in parallel (e.g., parallel processing). At 208, the control system 116 closes the shutter 144. At 210, the control system 116 ceases the peak illumination and commands a normal headlight illumination or no illumination. Steps 208 and 210 may be performed in parallel.

At 212, the control system 116 outputs the machine vision images to additional vehicle systems for subsequent usage. This could include, for example only, the control system 116 utilizing the machine vision image for an autonomous driving feature of the vehicle 100, such as object detection and classification within the machine vision image. The method 200 then ends or returns to 204 for one or more additional cycles.

Described herein are systems and methods for improving the range of machine vision at night without blinding oncoming drivers. The system provides a predetermined peak illumination of the headlights only for the period of time the camera shutter is open, thereby aligning the peak illumination period with the integration time of the camera sensor. This enables the vehicle camera to see farther. However, since the human eye integration time is substantially longer than the camera sensor integration time, the increased luminance is not perceptible to the human eye. As such, the system allows the continued use of lower cost camera sensors to achieve improved and effective performance without the added costs of very high sensitivity imagers. Moreover, nighttime regulatory use cases could be supported without the need for additional sensors that increase vehicle cost.

It will be appreciated that the terms "controller" or "control system" or "module" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A passenger vehicle, comprising:
- a camera system configured for machine vision functionality and including an image sensor and a shutter;
- an exterior lighting system that includes one or more headlights configured to illuminate a roadway ahead of the passenger vehicle and selectively provide a normal illumination and a predetermined peak illumination; and
- a control system configured to:
  - selectively open the shutter to obtain a machine vision image with the image sensor;
  - synchronize the exterior lighting system to provide the predetermined peak illumination while the shutter is open to thereby increase a range of the machine vision; and
  - output the machine vision image to a vehicle system for further use.

2. The vehicle of claim 1, wherein the predetermined peak illumination is provided only when the shutter is open.

3. The vehicle of claim 1, wherein the control system only provides the predetermined peak illumination during nighttime driving.

4. The vehicle of claim 1, wherein the control system provides the predetermined peak illumination for a duration shorter than a human eye integration time such that the predetermined peak illumination is imperceptible to the human eye of a driver of an oncoming vehicle.

5. The vehicle of claim 1, wherein the shutter is a global shutter.

6. The vehicle of claim 1, wherein the shutter is a rolling shutter.

7. The vehicle of claim 1, wherein the shutter and the exterior lighting system are synchronized to operate with an exposure period of approximately 10 ms when providing the predetermined peak illumination.

8. The vehicle of claim 1, wherein the camera system is a forward facing camera system.

9. The vehicle of claim 1, wherein the control system is configured to output the machine vision image to the vehicle system for object detection and classification.

10. The vehicle of claim 1, wherein the vehicle system is an advanced driver assistance (ADAS) system or autonomous driving system.

11. A method of increasing machine vision range of a passenger vehicle having an exterior lighting system that includes one or more headlights configured to illuminate a roadway ahead of the passenger vehicle and selectively provide a normal illumination and a predetermined peak illumination, and a camera system including an image sensor and a shutter, the method comprising:
- opening, by a control system, the shutter to obtain a machine vision image with the image sensor;
- synchronizing, by the control system, the exterior lighting system to provide the predetermined peak illumination while the shutter is open to thereby increase the machine vision range; and
- outputting, by the control system, the machine vision image to a vehicle system for further use.

12. The method of claim 11, wherein the predetermined peak illumination is provided only when the shutter is open.

13. The method of claim 11, further comprising only providing the predetermined peak illumination during nighttime driving.

14. The method of claim 11, further comprising providing, by the control system, the predetermined peak illumination for a duration shorter than a human eye integration time such that the predetermined peak illumination is imperceptible to the human eye.

15. The method of claim 11, wherein the shutter is a global shutter.

16. The method of claim 11, wherein the shutter is a rolling shutter.

17. The method of claim 11, further comprising:

synchronizing the shutter and the exterior lighting system to operate with an exposure period of approximately 10 ms when providing the predetermined peak illumination.

18. The method of claim 11, wherein the camera system is a forward facing camera system.

19. The method of claim 11, further comprising outputting, by the control system, the machine vision image to the vehicle system for object detection and classification.

20. The method of claim 11, further comprising outputting, by the control system, the machine vision image to an advanced driver assistance (ADAS) system or autonomous driving system.

* * * * *